Patented Sept. 9, 1941

2,255,265

UNITED STATES PATENT OFFICE 2,255,265

URANE COMPOUNDS AND METHOD OF OBTAINING SAME

Russell Earl Marker, State College, Pa., assignor to Parke, Davis & Company, Detroit, Mich., a corporation of Michigan No Drawing. Application August 29, 1938, Serial No. 227,428

8 Claims. (Cl. 260—397.4)

The invention relates to preparation of urane derivatives having oxygenated carbon atoms at positions 3 and 11.

The present invention is a continuation-in-part of my copending application, Serial No. 183,137, filed January 3, 1938. Urane is considered as being isomeric with pregnane in having a different configuration at the No. 9 carbon atom. The same relationship holds with the corresponding derivatives of these two hydrocarbons.

The numbering of the framework carbon atoms in the urane molecule and its derivatives described in the present invention is the same as the known system used for pregnane and can be represented as follows:

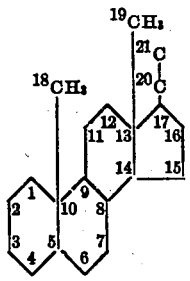

Numbering of the urane carbon atoms

This application relates to derivatives of urane having oxygenated groups at the No. 3 and No. 11 carbon atoms.

The type formula for such oxygenated derivatives of the present invention is,

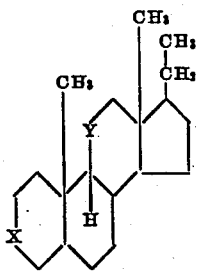

where X and Y represent the same or different members of the group consisting of >C=O and >CHR, R being hydroxyl (—OH) or a group which upon hydrolysis is converted into a hydroxyl group, such as —O—acyl, —O—alkyl, —O—aryl and halogen.

I have found that the uranes of this invention oxygenated only at $C_3$ and $C_{11}$ can be isolated from pregnancy urine.

The new compounds may be obtained by various methods. For example, one may start with pregnancy urine, such as pregant mares' urine, obtain therefrom a non-phenolic carbinol fraction from which trihydroxy steroids have been removed and which contains ketones, remove the latter by means of a ketone reagent from the non-ketonic carbinols, separate and purify uranol-11-one-3 and any other keto-uranes present from the ketone fraction and treat the non-ketonic carbinol fraction to separate out purified non-ketonic carbinols, such as uranediol-3,11.

EXAMPLE 1.—*Preparation of uranol-11-one-3*

An organic solvent extract of 30,000 gallons of pregnant mares' urine, after treatment with alkaline aqueous solution to take out phenolic sex hormones, is hydrolyzed, for example by alkali hydroxide solution. The hydrolyzed product is then steam-distilled a few hours to distill off the volatile material. The hydrolyzed residue from the steam-distillation is extracted with a solvent for uranol-11-one-3, such as benzol, most of the benzol is evaporated from the extract and the residue allowed to stand until crystallization occurs. The crystals consist of uranetriol and pregnantriol and are filtered off. The mother liquors containing the uranol-11-one-3 are made up to 2.5 liters by adding alcohol, the solution clarified by means of decolorizing charcoal if necessary, and then heated with 400 grams of Girard's reagent (betaine hydrazine chloride). Ice and water are added and the non-ketonic material extracted thoroughly with ether. The ether extract is reserved for use in Example 2. The aqueous layer is acidified with an excess of hydrochloric acid and warmed for an hour on a steam bath. The ketonic matter is extracted with ether and the ether extract washed with water and then distilled to remove ether and water. The residual oil is again put through the treatment with Girard's reagent to remove small amounts of inert material which are carried through mechanically. About 30 grams of oily ketonic material are thereby obtained.

The ketones are dissolved in 300 cc. of alcohol and boiled for an hour with 50 grams of semicarbazide hydrochloride and 60 grams of sodium acetate. The mixture is distilled to remove almost all the alcohol and the resulting paste is stirred with water, filtered, and washed with water and then with ether. The washed solid semicarbazone mixture is treated as follows:

The semicarbazone mixture is take up in and crystallized from alcohol. The first crystals are filtered off and the filtrate concentrated. The next crop of semicarbazone crystals which comes out of the concentrated filtrate is filtered off and dried. These semicarbazone crystals have a melting point of 231° C. They are hydrolyzed by boiling for an hour with 50 parts by volume of alcohol and 15 parts by volume of 1:2 dilute sulfuric acid. The reaction products of the hydrolysis are diluted with water, extracted with ether, the ether layer washed with water, and then evaporated to dryness. The ketone residue is treated with a dibasic organic acid acylating agent, e. g. succinic acid anhydride in pyridine, in order to convert hydroxy ketones to their half-succinic acid esters.

The reaction mixture is taken up in ether, the ether solution shaken with dilute aqueous hydrochloric acid to remove pyridine, and finally washed with sodium carbonate solution to extract the succinic acid mono-ester salts, thereby removing those hydroxy-ketones capable of forming half-succinic acid esters, such as allo-pregnanol-3β-one-20. Due to the inert nature of the $C_{11}$-hydroxyl of uranol-11-one-3, a mono-ester salt of this hydroxy ketone does not form. The remaining ether solution is evaporated to remove the ether and the residue distilled in a low vacuum, that is, around 0.0004 mm. pressure. The portion distilling at 160–200° C. is collected and taken up in acetone. The acetone solution is cooled and diluted with water to cause uranol-11-one-3 to separate in crystalline form. The crystals, after a few recrystallizations from acetone, have a melting point of 165° C. In mixed melting point tests, they depress the melting point of uranedione (melting point 180° C.) and allo-pregnandione (melting point 200° C.). It gives the Zimmerman test, Z. physiol. Chem. 233, 257 (1935), showing the presence of a ketone group at carbon atom No. 3. Upon oxidation with chromic acid the crystalline compound gives uranedione, thereby proving its structure to be that of uranol-11-one-3.

Anal. calc. for $C_{21}H_{34}O_2$: C, 79.2; H, 10.8. Found: C, 79.2; H, 10.8.

This uranol-11-one-3 melting at 165° C. forms a gelatinous semicarbazone when reacted with semicarbazide. The dry semicarbazone melts at 250° C.

EXAMPLE 2.—*Uranediol-3,11*

About one-thirtieth of the non-ketonic ethereal extract obtained in Example 1 above, after treatment by Girard's reagent of a non-phenolic pregnant mare's urine fraction from which uranetriols and pregnantriols had previously been removed, is dissolved in 400 cc. of ether. Two liters of ligroin are added to this solution, the mixture cooled in a salt-ice bath for one hour and the upper liquid decanted from the precipitated tar. The decanted supernatant liquid is distilled until about two-thirds of the solvent is removed and then cooled in a salt-ice bath, and the supernatant liquid poured off the precipitate. This precipitate is made up to a volume of 750 cc. with 95% ethanol. The solution is heated to boiling and a hot solution of 25 grams of digitonin in 1.5 liters of 95% ethanol is added. A precipitate forms after a few minutes. The mixture is cooled to 18° C. and filtered after about two hours to remove insoluble digitonides. The filtrate is evaporated to a volume of about 50 cc. and one liter of ether is added. A precipitate forms and is filtered off and washed with ether. It is the digitonide which is soluble in 95% alcohol and weighs about 8 grams. It is dissolved in 50 cc. of hot pyridine and heated 30 minutes on a steam bath. The resulting solution is then poured into one liter of ether and the precipitate which forms is filtered off and washed with ether. The filtrate is washed with dilute hydrochloric acid and then with water. The ether is distilled from the washed filtrate and the crystals which separate are taken up in and recrystallized from acetone. The crystals of uranediol-3β,11 thus obtained are in the form of white needles melting at 210° C.

Anal. calc. for $C_{21}H_{36}O_2$: C, 78.8; H, 11.3. Found: C, 78.8; H, 11.3.

The uranediol-3β,11 did not discolor bromine and is therefore a saturated compound. It gave a 20-degree depression in melting point when mixed with allo-pregnandiol-3β,20α.

In the Journal of the American Chemical Society 59:2291 (November, 1937) it is shown that when sodium in boiling xylene acts upon a 3-hydroxy compound having the molecular framework of uranediol-3,11, the chief product obtained is the epimer in which the 3-hydroxyl group occupies a position trans to the hydrogen atom at $C_5$. In the case of uranediol-3β,11, isomerization with sodium in boiling xylene gives as the chief product a material which differs from the original diol in giving no precipitate with digitonin, thus inducating that the original uranediol-3β,11 has the normal configuration at $C_5$. This configuration is illustrated by the following formula where the 3-hydroxyl and the 5-hydrogen atom are in the cis-position and lie on the same side of the molecule.

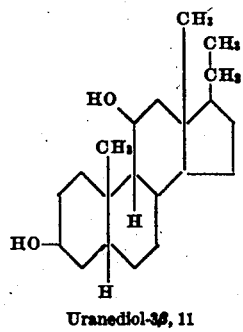

Uranediol-3β, 11

EXAMPLE 3.—*Uranediol-3β,11-diacetate*

About 75 mgms. of uranediol-3,11, obtained as described in Example 2 above, are refluxed with 4 cc. of acetic anhydride for 35 minutes. The acetic anhydride is evaporated in a vacuum and the crystalline residue thereby obtained recrystallized from methanol to a constant melting point of 160° C. The crystals are in the form of small white plates.

Anal. calc. for $C_{25}H_{40}O_4$: C, 74.4; H, 10.0. Found: C, 74.6; H, 10.0.

Instead of using acetic anhydride in this example, other carboxylic acid anhydrides or halides and similar acylating agents may be used. For example, when the anhydrides of propionic, butyric, succinic, benzoic and other carboxylic acids or their halides, such as acetyl chloride, are used, the corresponding di-esters are obtained. The derivatives of uranediol-3,11 in which one or more of the hydroxyl groups are replaced by halogen are obtained by treating the diol with a halogenating agent, such as phosphorus halide, thionyl halide, etc. The halides can, in turn, be converted into their ether compounds, for example by treatment with an alkali metal alcoholate or phenolate.

Example 4.—*Uranedione-3,11*

100 mgms. of uranediol-3,11 are dissolved in 30 cc. of glacial acetic acid. A solution of 150 mgms. of chromic acid ($CrO_3$) in 10 cc. of 90% acetic acid is then added at room temperature. A precipitate separates out at first but dissolves after the addition of the chromic acid is completed. The mixture is allowed to stand at room temperature for 45 minutes. Water is added and the mixture extracted twice with 75 cc. portions of ether. The combined ether extracts are washed with water and then with saturated sodium carbonate solution. The ether is evaporated off the washed extract and the crystalline residue thereby obtained is dissolved in 5 cc. of methanol and cooled in a salt-ice bath. One-half cc. of water is added slowly and the precipitate which forms is filtered off and recrystallized from 90% methanol. Recrystallization from acetone gives crystals of uranedione-3,11 which melt at 177.5° C.

Anal. calc. for $C_{21}H_{32}O_2$: C, 79.7; H, 10.2. Found: C, 79.78; H, 10.3.

The uranedione of this example forms a mono-semicarbazone with semicarbazide. For example, a solution of 20 mgms. of uranedione, 30 mgms. of semicarbazide and 30 mgms. of sodium acetate in 10 cc. of alcohol is refluxed on a steam bath for an hour and then diluted with water and filtered. The solid semicarbazone is washed with ether and crystallized from alcohol. The crystals melt at 245° C. with decomposition. The semicarbazone is a mono-semicarbazone, as would be expected from the known inertness of a $C_{11}$-oxygenated group in derivatives having a dimethyl cyclopentano perhydrophenanthrene molecular framework of carbon atoms.

Anal. calc. for $C_{22}H_{35}O_2H_3$: C, 70.7; H, 9.4. Found: C, 70.4; H, 91.1.

The uranedione-3,11 of this example also reacts with 2,4-dinitro phenylhydrazine to form a mono-2,4-dinitro phenylhydrazone. For example, a solution of 30 mgms. of uranedione-3,11 and 40 mgms. of 2,4-dinitro phenylhydrazine in 10 cc. of refluxing alcohol is acidified with two drops of concentrated sulfuric acid and refluxed for five minutes. The solution is allowed to cool and the crystals which come out are filtered off and recrystallized from ethyl acetate to give the mono-2,4-dinitro phenylhydrazone of uranedione-3,11 having a melting point of 200° C. with decomposition.

Anal. calc. for $C_{27}H_{36}O_5H_4$: C, 65.4; H, 7.2. Found: C, 65.0; H, 7.3.

Uranedione-3,11 can be reduced by Clemmensen reduction, using zinc amalgam and hydrochloric acid, to the hydrocarbon, urane, melting at 128° C.

Example 4a

Another method of obtaining uranedione-3,11 is by oxidation of the mother liquors from crystallization of uranetriol and pregnanetriol from a non-phenolic carbinol fraction of pregnancy urine. The mother liquors contain uranediol-3,11 which is oxidized to uranedione-3,11. This can be done, for example, as follows.

Non-phenolic carbinol material of mares' pregnancy urine, obtained for example during operation of the known methods for production of phenolic estrogenic hormones, is hydrolyzed with a large excess of sodium hydroxide solution and then steam-distilled for three hours to distill off the volatile material. The hydrolyzed residue from the distillation is extracted with benzol, the solvent evaporated off, and the tarry residue allowed to stand until solidification and partial crystallization have taken place. An equal volume of ether is added to the solidified mixture, and the crystalline product is then filtered off. The filtrate is evaporated to give a yellow oil. This oil is dissolved in acetic acid, cooled to 20° C. and oxidized with an equal weight of chromium trioxide in 90% acetic acid. The oxidation is carried out by mixing the solutions at 20° C. and allowing them to stand at this temperature for one hour. The solution is then diluted with water, extracted with ether, and the ethereal extract washed with water and sodium carbonate solution. The washed ethereal solution is evaporated to dryness. The residue is crystallized from ethyl alcohol and consists of a mixture of uranetrione and uranedione. The trione and the dione are separated by fractionally separating them from ethyl alcohol and methyl alcohol to yield uranedione-3,11 melting at 182° C.

The uranedione-3,11 gives a depression in melting point when mixed with uranetrione melting at 245° C. The uranedione contains no hydroxyl group, as is proved by refluxing it with acetic anhydride, from which it can be recovered unchanged. The uranedione of this example analyzes practically the theoretical values of carbon and hydrogen required for $C_{21}H_{32}O_2$.

Example 5.—*Uranol-3-one-11*

A sample of uranedione-3,11 is dissolved in acetic acid and reduced under a pressure of about 45 pounds of hydrogen at room temperature and in presence of a platinum oxide catalyst. The reduction mixture is filtered and the acetic acid evaporated from the filtrate to give a residue of uranol-3-one-11 which is obtained in crystalline form by crystallization from a solvent, such as alcohol or acetone.

The compounds of the invention can be obtained by a variety of methods and numerous changes can be made in the details of the examples given above. As has already been mentioned, various carboxylic acid anhydrides and their halides can be used with the hydroxy compounds of the invention to replace the hydroxyl by a group capable upon hydrolysis of yielding the original hydroxy compound. Halogen compounds corresponding to the hydroxy compounds are produced by treating the hydroxy compounds with halogenating agents, such as phosphorous halide, thionyl halide, etc. The ether derivatives, in which the hydroxyl has been replaced by the group —O—alkyl or —O—aryl, are obtained by methods capable of converting secondary alcohols into ethers. For instance, an alkali metal alcoholate derivative of urane can be treated with an alkyl halide or the urane compound having a hydroxyl replaced by halogen can be treated with an alkali metal alcoholate or phenolate.

The mono-hydroxy and di-hydroxy compounds can also be obtained from uranedione-3,11 by partial or complete reduction of its ketone groups. Moreover, uranediol-3,11 can be partially oxidized, with or without previous protection of one of the hydroxyl groups, e. g by acylation, to give uranol-one compounds.

What I claim as my invention is:

1. Method for the production of urane derivatives oxygenated only at the number 3 and number 11 carbon atoms which comprises treating a non-phenolic ketonic carbinol fraction of pregnancy urine, from which trihydroxy steroids have been removed, with a ketone reagent, separating the reacted ketone fraction from the unreacted non-ketonic carbinol fraction and separately treating said fractions for isolation therefrom of purified individual ketonic and non-ketonic oxygenated urane compounds.

2. Method for the production of urane derivatives oxygenated only at the number 3 and number 11 carbon atoms which comprises treating a non-phenolic ketonic carbinol fraction of pregnancy urine, from which trihydroxy steroids have been removed, with a ketone reagent, separating the reacted ketone fraction from the unreacted non-ketonic carbinol fraction, treating the latter carbinol fraction with digitonin to form digitonides, separating the digitonide soluble in strong alcoholic solution from the digitonides insoluble in strong alcoholic solution, decomposing the soluble digitonide to liberate uranediol-3,11 and separating the uranediol-3,11 from the digitonin.

3. Method for the production of uranediol-3,11 which comprises treating a non-phenolic ketonic carbinol fraction of pregnant mare's urine, from which uranetriol and pregnantriol have been removed, with a betaine hydrazine halide to form water-soluble ketone derivatives, extracting the non-ketonic carbinols with an organic solvent, adding a hydrocarbon liquid which reduces the solubility to precipitate out impurities, separating the liquid from the precipitated impurities and concentrating and cooling the separated liquid to form a precipitate, separating the precipitate, dissolving it in 95% ethyl alcohol, reacting digitonin with the alcoholic solution, removing the insoluble digitonides formed thereby, concentrating the remaining solution of soluble digitonides and adding a solvent capable of decreasing the solubility of the soluble digitonides, thereby obtaining the solid digitonide of uranediol-3,11, decomposing the latter compound to liberate uranediol-3,11, and separating said diol from the digitonin.

4. Oxygenated urane compounds having the formula,

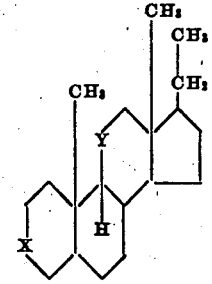

where X and Y represent the same or different members of the group consisting of >CO and >CHR, R being a hydroxyl or a group which upon hydrolysis is converted into a hydroxyl group.

5. Uranedione-3,11, melting at about 182° C.

6. Uranol-11-one-3, melting at approximately 165° C.

7. A carboxylic acid ester of uranediol-3,11.

8. Uranediol-3β,11 diacetate, melting at approximately 160° C.

RUSSELL EARL MARKER.